(12) United States Patent
Zhang

(10) Patent No.: US 9,754,266 B2
(45) Date of Patent: Sep. 5, 2017

(54) ONLINE SERVING THRESHOLD AND DELIVERY POLICY ADJUSTMENT

(75) Inventor: Qiong Zhang, Sunnyvale, CA (US)

(73) Assignee: Excalibur IP, LLC, New York, NY (US)

(*) Notice: Subject to any disclaimer, the term of this patent is extended or adjusted under 35 U.S.C. 154(b) by 1979 days.

(21) Appl. No.: 12/764,732

(22) Filed: Apr. 21, 2010

(65) Prior Publication Data
US 2011/0264511 A1    Oct. 27, 2011

(51) Int. Cl.
*G06Q 30/02* (2012.01)

(52) U.S. Cl.
CPC ......... *G06Q 30/02* (2013.01); *G06Q 30/0244* (2013.01); *G06Q 30/0242* (2013.01)

(58) Field of Classification Search
USPC .......................................... 705/14.41, 14.43
See application file for complete search history.

(56) References Cited

U.S. PATENT DOCUMENTS

2011/0112900 A1* 5/2011 Sanghavi ............... G06Q 30/02
                                                    705/14.43

OTHER PUBLICATIONS http://www.webster-dictionary.org/definition/facilitating, "Webster's 1913 Dictionary—Facilitate".*
"Real Time Bid Optimization with Smooth Budget Delivery in Online Advertising", by Lee et al. May 15, 2013. p. 1-13.*

* cited by examiner

*Primary Examiner* — William A Brandenburg
(74) *Attorney, Agent, or Firm* — Mauriel Kapouytian Woods LLP; Lana Akopyan; James J. Woods

(57) ABSTRACT

The present invention provides techniques for use in association with online advertising, relating to use of serving thresholds, associated with predicted click through rates, and delivery policies, associated with advertising inventory serving and distribution. An offline-trained machine learning-based model may be utilized in advertising serving decision-making in connection with serving opportunities. However, serving thresholds and delivery policies, for use in association with the model in serving decision-making, may be adjusted online, such as in real-time or near real-time, based on information obtained online affecting factors such as predicted click through rates and advertising inventory distribution.

20 Claims, 5 Drawing Sheets

ONLINE SERVING THRESHOLD AND DELIVERY POLICY ADJUSTMENT

BACKGROUND

In targeting, such as behavioral targeting, historical information such as online user behavior information can be used in targeting high-performing advertisements to users. In this regard, a taxonomy, such as a hierarchical taxonomical tree of categories or topics, may be utilized, in which nodes in the taxonomy may represent categories of interest or behavioral targeting categories. A machine learning-based model may be utilized in selecting advertisements for matching with serving opportunities and for serving to particular users. Historical user behavior information may be used to train the model offline. For example, such models may be trained periodically, such as monthly, weekly, or even more frequently, using updated historical user behavior information.

Online, the offline-trained model may be utilized in advertisement targeting and in determining or facilitating determination of such things as serving thresholds and delivery policies. Serving thresholds may include scores, which may directly correspond to particular CTRs, for instance. The serving thresholds may, for instance, relate to certain minimum scores or CTRs that will be required for serving of an advertisement in a particular category of the taxonomy, for instance (of course, there are many details in the process which are not described here, for simplicity of explanation). Delivery, policies may, for instance, govern serving based at least in part on available advertising inventory, or available inventory for a particular taxonomical category, etc. For example, serving thresholds may be set in each category in such a way that both a desired level of performance, measured by category-specific CTR, and a desired volume of deliverable ad impressions in the same category, are predicted to be achieved. Naturally, for a large-scale operation, scores and thresholds may be set based on many other factors as well, and will take into account many other variables across many advertisers, campaigns, etc. Generally, the model may be used in making predictions and projections based on the offline training.

Generally, serving thresholds and delivery policies are determined offline. Online, real-time or near real-time information, including newly obtained user behavior information, etc., can be fed into the model, and the model can be used in determining when circumstances are right for serving, such as when a particular serving opportunity to a particular user is predicted or projected by the model to meet requirements such as the predetermined serving thresholds and delivery policy requirements.

As mentioned, such models are generally refreshed periodically by offline training with newly collected historical user behavior information. Models may only be refreshed so frequently, such as monthly, weekly, or perhaps daily. However, circumstances, events, and developments occur and change dynamically in real time, and the model cannot be refreshed constantly to include such information as training information. Such dynamic developments may include, as just one example, a breaking news event, which may affect anticipated CTRs or pertain to optimal delivery policies, etc. Existing methods utilizing, for example, serving thresholds and delivery policies set using models that may have been refreshed offline may lead to suboptimal serving-related decision-making and determinations.

There is a need for methods and systems for improving or optimizing serving decision-making and determinations and associated serving thresholds and delivery policies.

SUMMARY

Some embodiments of the invention provide methods and systems for use in association with online advertising, relating to use of serving thresholds, associated with predicted click through rates, and delivery policies, associated with advertising inventory serving and distribution. An offline-trained machine learning-based model may be utilized in advertising serving decision-making in connection with serving opportunities. However, serving thresholds and delivery policies, for use in association with the model in serving decision-making, may be adjusted online, such as dynamically in real-time or near real-time, based on information obtained online affecting factors such as predicted click through rates and advertising inventory distribution.

In some embodiments, for example, use of an offline-trained machine learning-based model in combination with online-adjusted serving thresholds and delivery policies can provide for efficient and effective techniques for optimizing, or better optimizing, behavioral targeting and advertising inventory distribution.

While the invention is described with reference to the above drawings, the drawings are intended to be illustrative, and the invention contemplates other embodiments within the spirit of the invention.

DETAILED DESCRIPTION

Figure 1:
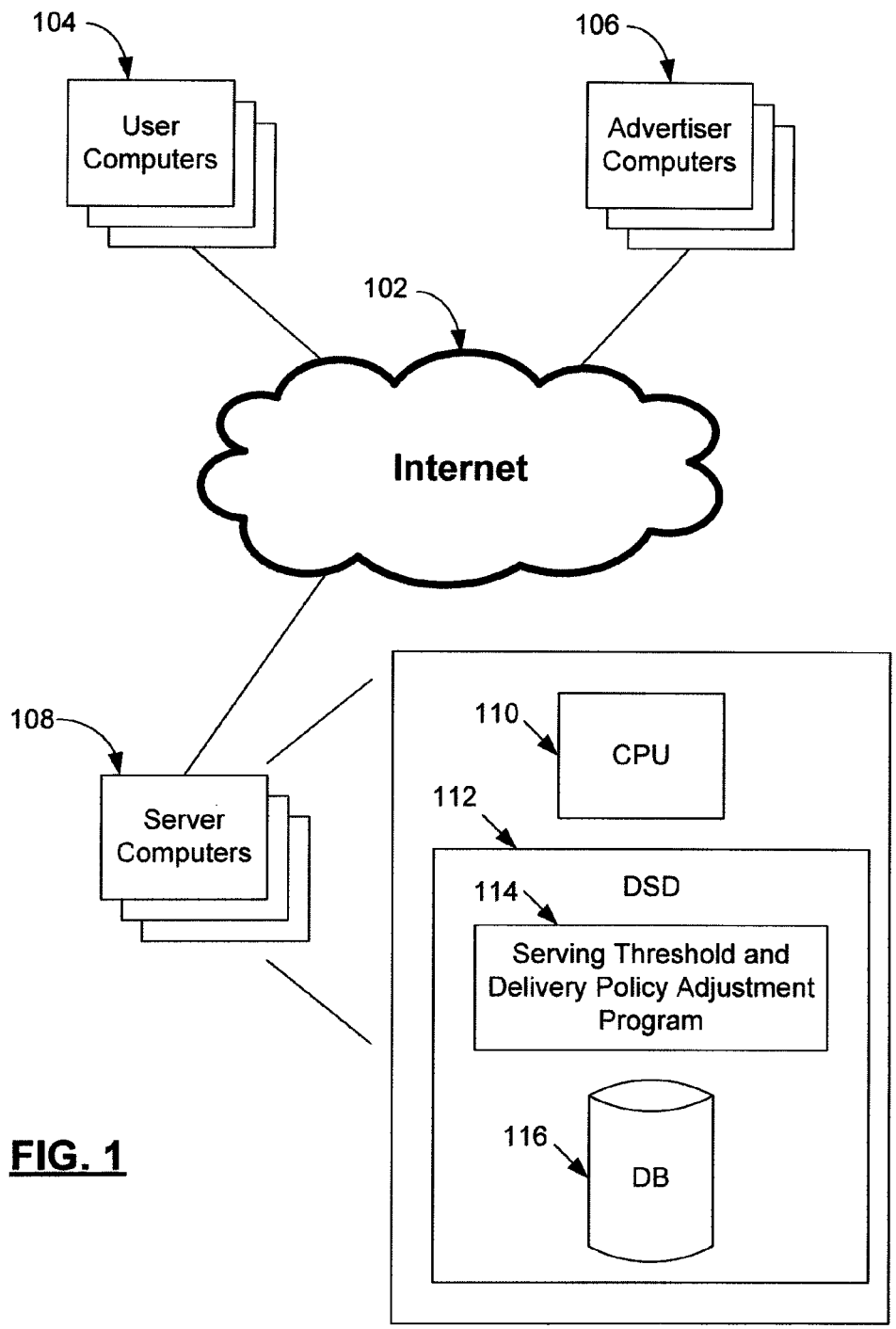
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, PDAs, etc.

Each of the one or more computers 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and a Serving Threshold and Delivery Policy Adjustment Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Figure 2:
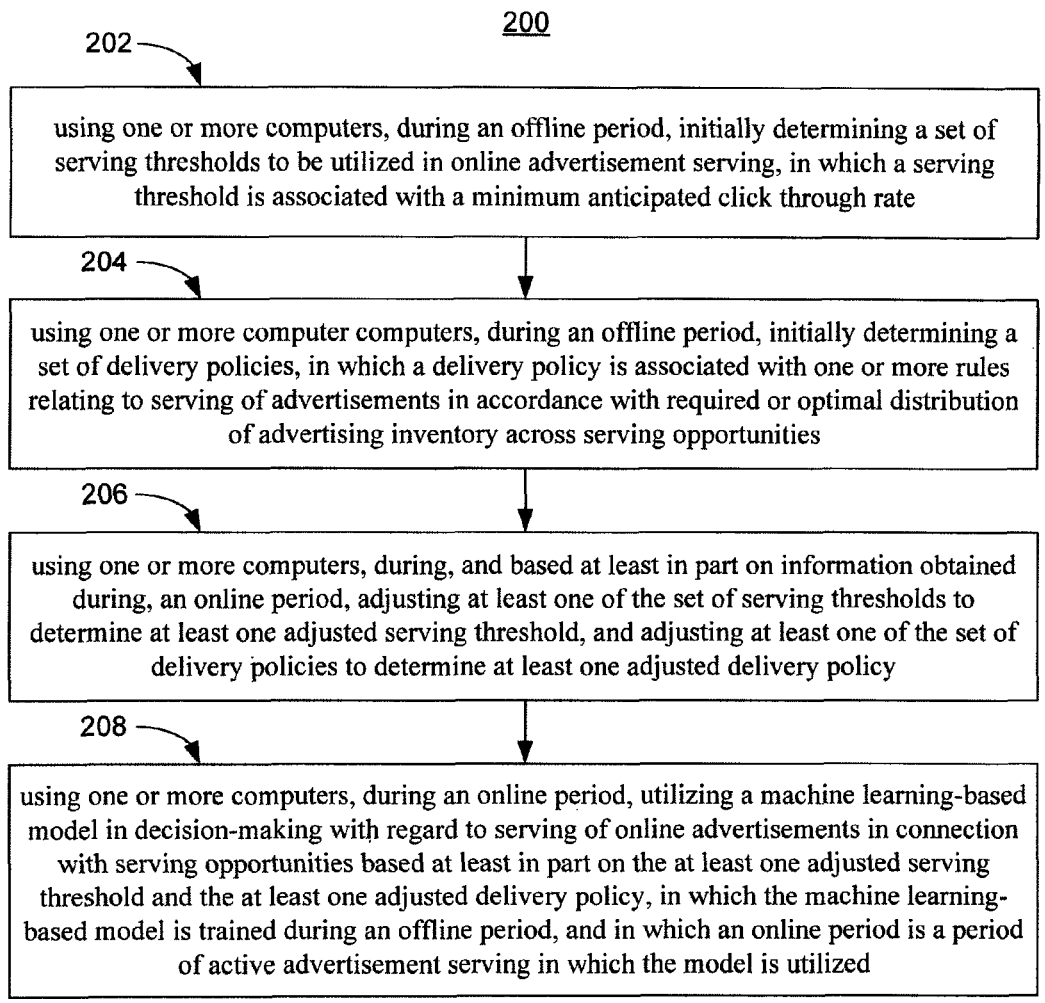
FIG. 2 is a flow diagram illustrating a method according to one embodiment of the invention.

FIG. 2 is a flow diagram illustrating a method 200 according to one embodiment of the invention. At step 202, using one or more computers, during an offline period, a set of serving thresholds is initially determined, to be utilized in online advertisement serving, in which a serving threshold is associated with a minimum anticipated click through rate.

At step 204, using one or more computer computers, during an offline period, a set of delivery policies is initially determined, in which a delivery policy is associated with one or more rules relating to serving of advertisements in accordance with required or optimal distribution of advertising inventory across serving opportunities.

At step 206, using one or more computers, during, and based at least in part on information obtained during, an online period, adjustment is performed of at least one of the set of serving thresholds to determine at least one adjusted serving threshold, and adjustment is performed of at least one of the set of delivery policies to determine at least one adjusted delivery policy.

At step 208, using one or more computers, during an online period, a machine learning-based model is utilized in decision-making with regard to serving of online advertisements in connection with serving opportunities based at least in part on the at least one adjusted serving threshold and the at least one adjusted delivery policy, in which the machine learning-based model is trained during an offline period, and in which an online period is a period of active advertisement serving in which the model is utilized.

Figure 3:
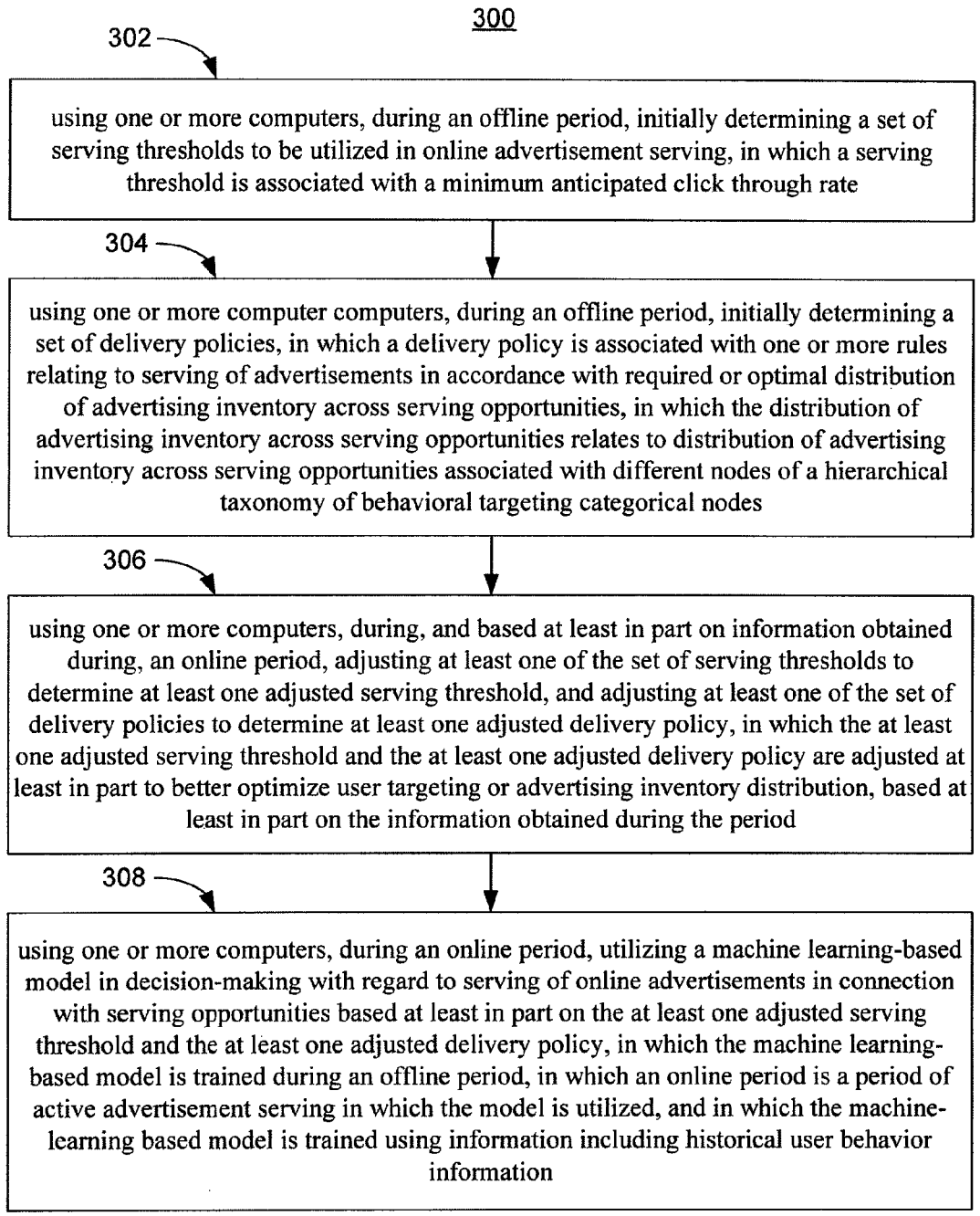
FIG. 3 is a flow diagram illustrating a method according to one embodiment of the invention.

FIG. 3 is a flow diagram illustrating a method 300 according to one embodiment of the invention. At step 302, using one or more computers, during an offline period, a set of serving thresholds are initially determined, to be utilized in online advertisement serving, in which a serving threshold is associated with a minimum anticipated click through rate.

At step 304, using one or more computer computers, during an offline period, a set of delivery policies is initially determined, in which a delivery policy is associated with one or more rules relating to serving of advertisements in accordance with required or optimal distribution of advertising inventory across serving opportunities. The distribution of advertising inventory across serving opportunities relates to distribution of advertising inventory across serving opportunities associated with different nodes of a hierarchical taxonomy of behavioral targeting categorical nodes.

At step 306, using one or more computers, during, and based at least in part on information obtained during, an online period, adjustment is performed of at least one of the set of serving thresholds to determine at least one adjusted serving threshold, and adjustment is performed of at least one of the set of delivery policies to determine at least one adjusted delivery policy. The adjusted serving threshold and the adjusted delivery policy are adjusted at least in part to better optimize user targeting or advertising inventory distribution, based at least in part on the circumstances occurring during the period.

At step 308, using one or more computers, during an online period, a machine learning-based model is utilized in decision-making with regard to serving of online advertisements in connection with serving opportunities based at least in part on the at least one adjusted serving threshold and the at least one adjusted delivery policy. The machine learning-based model is trained during an offline period, using information including historical user behavior information. Using one or more computers, during an online period, the machine learning-based model is utilized in decision-making with regard to serving of online advertisements in connection with serving opportunities based at least in part on the at least one adjusted serving threshold and the at least one adjusted delivery policy. An online period is a period of active advertisement serving in which the model is utilized.

Figure 4:
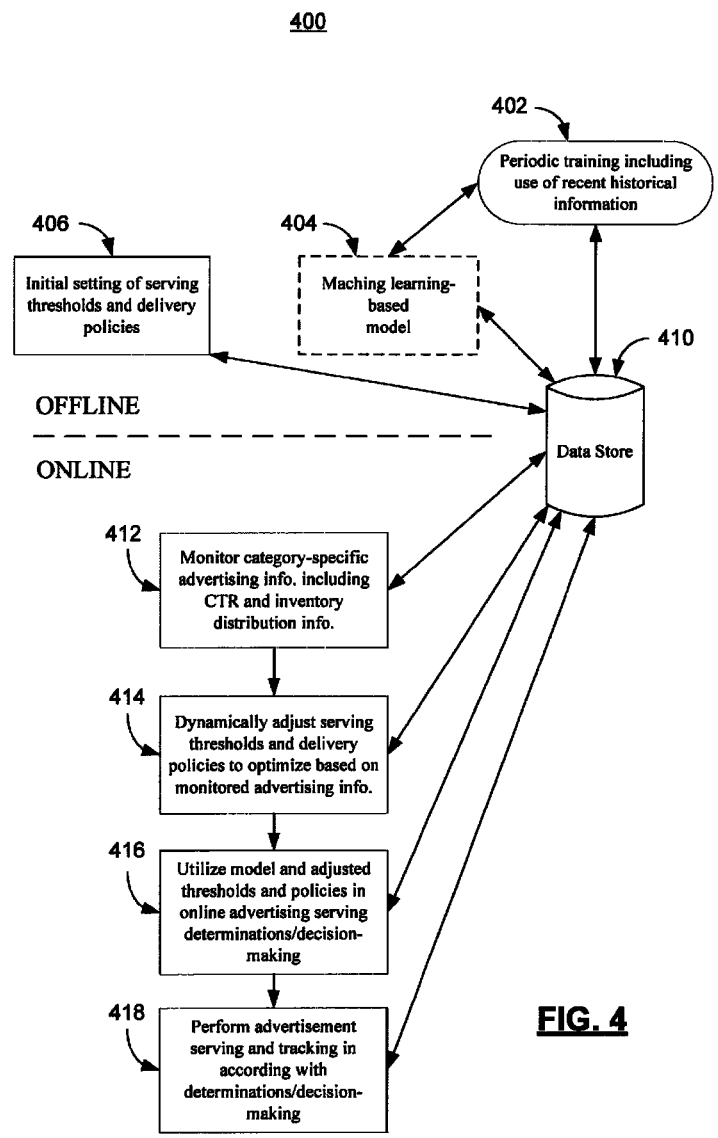
FIG. 4 is a flow diagram illustrating a method according to one embodiment of the invention.

FIG. 4 is a flow diagram illustrating a method 400 according to one embodiment of the invention. A machine learning-based mode is depicted by block 404. The model 404 may be a featured-based model. Information, including advertising-related information, is used as training information for the model 404. The information may be stored in a data store, such as data store 410. The data store 410 can be or include any of various forms or manners of data storage, and may or may not include one or more databases. The information may include, for example, historical user behavior information, click through rate or other advertisement performance information, advertisement inventory and distribution information, and other information. The information may be category-specific, such as by being specific to nodes of a hierarchical behavioral targeting taxonomy.

The model 404 is trained offline periodically, as represented by block 402. For example, the model may be trained monthly, weekly, daily, or otherwise.

Serving thresholds and delivery policies are initially determined offline, as represented by block 406, such as prior to an online period. An online period may be a period during which active online advertisement serving takes place, including use of the model 404. An offline period may be period during which active advertisement serving using the model is not taking place, or during which active advertisement serving associated with a particular active period is not taking place, such as a period prior to an active serving period, or prior to a particular active serving period.

At step 412, online monitoring, tracking, and storing, such as in the data store 410, is performed of category-specific advertising information, including CTR and inventory distribution information.

At step 414, serving thresholds and delivery policies are dynamically adjusted online to optimize based on monitored advertising information. For example, the serving thresholds and delivery policies may be adjusted in real-time or near real-time, based on real-time or near real-time advertising information.

At step 416, online, the model, as well as adjusted serving thresholds and adjusted delivery policies, are utilized in online advertising serving determinations/decision-making.

Figure 5:
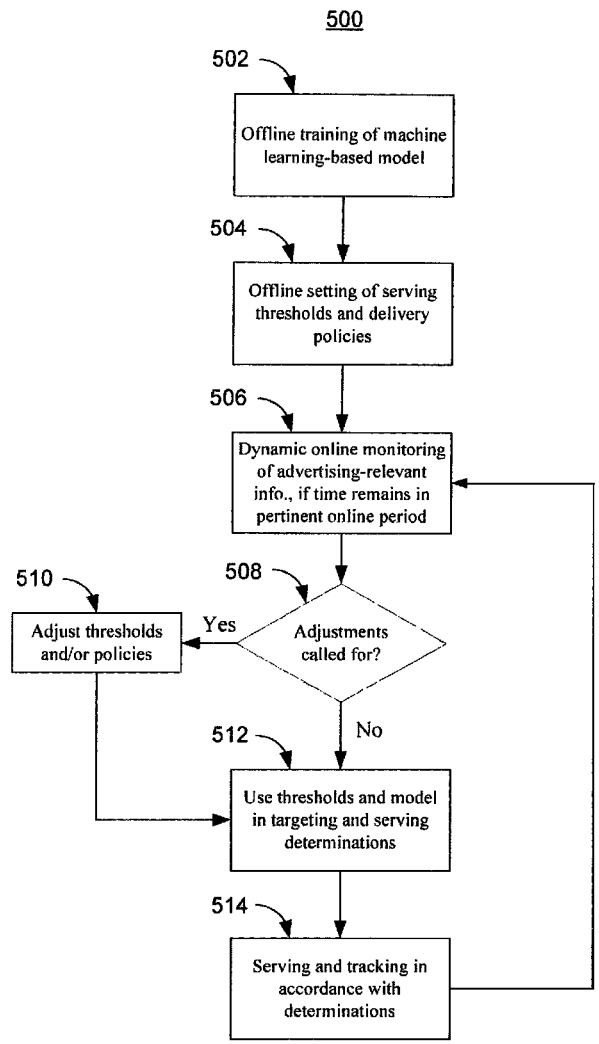
FIG. 5 is a flow diagram illustrating a method according to one embodiment of the invention.

FIG. 5 is a flow diagram illustrating a method 500 illustrating one embodiment of the invention. At step 502, offline training is performed of a machine learning-based model.

At step 504, offline setting of serving thresholds and delivery policies is performed.

At step 506, dynamic, such as real-time or near real-time, monitoring is performed of advertising-relevant information, such as category-specific advertisement performance and inventory distribution information, assuming time remains in the pertinent online period. Advertising-relevant information can also include any other types of information that may affect advertisement performance or optimal delivery policies, such as time-based or news-based developments that may alter predicted click through rate for a particular behavioral targeting category, for instance.

At step 508, the method 500 queries whether adjustments to serving thresholds or delivery policies are indicate based on the monitored advertising-relevant information. Various embodiments of the invention contemplate various ways by which particular adjustments may be determined, and by which underlying anticipated changes, such as changes in predicted click through rate for a particular category, for instance, may be determined or estimated.

If adjustments to serving thresholds and delivery policies are not called for based on presently available monitored information, then the method 500 proceeds to step 512.

If adjustments are called for, then corresponding adjustments are made at step 510, and then the method 500 proceeds to step 512.

At step 512, thresholds (including any currently adjusted thresholds) and the model 404 are utilized in targeting and serving determinations.

Following step 512, the method 500 return to 506, from which point newly available information can be monitored and utilized, if time remains in the pertinent online period.

Generally, some embodiments of the invention provide a framework that can be utilized to adjust serving thresholds and delivery policies, in online advertising, such as to improve targeting performance or inventory distribution based on dynamically, real-time or near real-time monitored category specific such as behavioral targeting category-specific) click through rate (or other advertisement performance) or inventory information.

As mentioned, some embodiments of the invention include use of an offline-trained machine learning-based model, which makes use of information including historical user information, in determinations and decision-making regarding serving of particular advertisements to particular users and in connection with particular serving opportunities. As a simple example, the model may be used online in dynamically updating a score for a particular user based on circumstances that may include activity of the user. The score may correspond with a predicted click through rate for the user in connection with a particular behavioral targeting category, for instance. If a user then appears online, for example, at a time within a particular targeting time-frame, and the user's score at that time is at or above a particular threshold, then an advertisement corresponding to that category may be served to the user in connection with an associated serving opportunity. Serving thresholds and delivery policies may be utilized, for example, in achieving desired levels of advertisement performance in connection with particular categories of a hierarchical taxonomy of user interest categories.

In some embodiments of the invention, thresholds and policies, initially determined offline, are adjusted online in accordance with monitored online information, For instance, predicted click through rate may vary with many real-time or online-occurring circumstances, such as time of time of day or week, or the occurrence of a breaking news or other sudden or real-time occurring or developing event, etc. The model, trained periodically offline, has not been refreshed to take into account this information. However, adjustment of serving thresholds and serving policies can be utilized to account for and optimize based on the monitored online information. The model can then be utilized along with the adjusted thresholds and serving policies to produce better optimized results. For example, the thresholds and policies can be adjusted in order to, for example, better achieve desired levels of performance in connection with particular categories, better distribution of advertising inventory across categories, etc.

For instance, a sudden event such as the death of an actor, or a celebrity scandal, can trigger a time-dependent spike in user interest in certain categories. As another example, shopping activity may be monitored to peak during certain periods or holidays, or as a result of current events, such as prior to a predicted rain storm or snow storm, for instance. Adjusted thresholds and policies can be used to better optimize, effectively and efficiently allowing taking into account anticipated effects of such circumstances or events, which anticipated effects and the degree of such effects may be estimated or calculated in any of various ways.

In some embodiments, methods are utilized that include online monitoring of inventory or inventory distribution, and CTR, from the specified categories, such as from or in a real-time or near real-time online behavioral targeting scoring system (in which scores may correspond directly with predicted CTRs, for instance), and an advertisement serving system.

For instance, inventory information can be derived from or in part from any of various metrics. These may include, for example, type and number of events affecting a specified category during given time window, number of unique users affected in a specified category during a given time window, number of affected users whose interest scores are above current category-specific serving threshold, for example, and various other metrics and information. In some embodiments, a real-time or near real-time behavioral targeting system may obtain all advertising click and view event information, allowing efficient calculation of category-specific CTR in a given time frame, for instance. Once the category-specific CTR is obtained, it can be utilized in various ways and for various purposes, including calculating and determining serving threshold adjustments, delivery policy adjustments, etc., in real-time or near real-time.

In some embodiments, serving policies may be adjusted, for example, to prioritize serving in particular categories. As a simple example, a particular user may be qualified to receive advertisements from a number of categories, but available applicable serving opportunities to the user may mean that only advertisements from some of the categories may be served. In such circumstances, if monitored online information leads to a determination that predicted CTR for a particular category is currently above that which was projected using the offline-trained model, then that category can be prioritized in terms of advertisement serving, such as by adjusting a delivery policy to emphasize or prioritize advertisement serving in that category.

In some embodiments, for example, a ratio of the current predicted CTR for a particular category to the projected CTR for the particular category using the offline-trained model, for a particular time window, can be used as at least one factor in determining delivery policy, where, for instance, a ratio greater than 1 may lead to a delivery policy adjustment that prioritizes that category for that time window. Furthermore, lower online-predicted CTRs can lead to adjustments that de-emphasize associated categories, etc. Over time, by using this technique repeatedly over time, a desired inventory distribution can be maintained while still increasing overall CTR, leading to increased revenue, etc. Generally, in some embodiments, online traffic patterns and pattern changes can be monitored and leveraged, through adjustments to serving thresholds and delivery policies, to better achieve or maintain online advertising goals and metrics, for instance, in an efficient and cost-effective manner.

While the invention is described with reference to the above drawings, the drawings are intended to be illustrative, and the invention contemplates other embodiments within the spirit of the invention.

The invention claimed is:

1. A method comprising:
    during an offline period, initially determining a set of serving thresholds to be utilized in online advertisement serving, wherein a serving threshold is associated with a minimum anticipated click through rate;
    during an offline period, initially determining a set of delivery policies, wherein a delivery policy is associated with one or more rules relating to serving of advertisements in accordance with required or optimal distribution of advertising inventory across serving opportunities;
    during an online period, receiving and storing by a server coupled to the Internet, category-specific advertising information in one or more data sources;
    during an online period, querying the one or more data sources to determine adjustments based on the stored category-specific advertising information;
    during an online period, and based at least in part on information obtained during an online period including the stored category-specific advertising information sent from the one or more data sources over the Internet, dynamically adjusting in real-time, based on the determined adjustments, at least one of the set of serving thresholds to determine at least one adjusted serving threshold, and dynamically adjusting in real-time at least one of the set of delivery policies to determine at least one adjusted delivery policy;
    during an online period, utilizing a machine learning-based model in dynamically updating decision-making in real-time with regard to serving of online advertisements in connection with serving opportunities based at least in part on the at least one adjusted serving threshold and the at least one adjusted delivery policy, adjusted dynamically during the online period, wherein the machine learning-based model is initially trained during an offline period with advertising-related information stored in and queried from the one or more data sources and dynamically updated during an online period with real-time adjustments, wherein an online period is a period of active advertisement serving in which the model is utilized; and
    during an online period, transmitting an online advertisement over the Internet based on a particular serving opportunity to a user device of a particular user based on the decision-making by the machine learning-based model.

2. The method of claim 1, comprising utilizing a hierarchical taxonomy of behavioral targeting categories in behavioral targeting of users, wherein nodes represent behavioral targeting categories, and wherein delivery policies are utilized in optimally or more optimally distributing serving of advertisement inventory across nodes of the taxonomy.

3. The method of claim 1, comprising training the model using information including historical user behavior information in association with online advertising.

4. The method of claim 1, wherein the at least one adjusted serving threshold and the at least one adjusted delivery policy are adjusted based at least in part on real-time or near real-time monitored click through rate information and advertising inventory distribution.

5. The method of claim 1, wherein the at least one adjusted serving threshold and the at least one adjusted delivery policy are adjusted based at least in part on real-time or near real-time monitored click through rate information and advertising inventory distribution in association with particular nodes of a hierarchical taxonomy of behavioral targeting categories, wherein the nodes represent behavioral targeting categories.

6. The method of claim 1, comprising utilizing serving thresholds in achieving desired levels of advertisement performance in connection with particular categories of a hierarchical taxonomy of user interest categories.

7. The method of claim 1, comprising adjusting at least one of the set of serving thresholds and at least one of the set of delivery policies based on a news event occurring during an online period, wherein the news event affects user interests pertinent in behavioral targeting.

8. The method of claim 1, comprising adjusting at least one of the set of serving thresholds and at least one of the set of delivery policies based on a calendar or chronologically-based circumstance occurring during an online period that effects user behavior pertinent in behavioral targeting.

9. The method of claim 1, comprising monitoring, during an online period, category-specific advertising inventory serving distribution information and category-specific click through rate information, for use in adjusting at least serving threshold and at least one delivery policy.

10. The method of claim 1, comprising monitoring, during an online period, category-specific advertising inventory serving distribution information and category-specific click through rate information, for use in adjusting at least serving threshold and at least one delivery policy, wherein the information is obtained from real-time or near real-time behavioral targeting and advertising serving systems.

11. The method of claim 1, comprising adjusting at least one delivery policy to reflect an increased predicted click through rate, for a time frame and for a particular behavioral targeting category, that was predicted online during a particular online period, relative to a predicted click through rate, for the time frame and associated with the category, that was predicted during an offline period.

12. The method of claim 1, comprising adjusting at least one delivery policy to reflect an increased predicted click through rate, for a time frame and for a particular behavioral targeting category, that was predicted online during a particular online period, relative to a predicted click through rate, for the time frame and associated with the category, that was predicted during an offline period, comprising prioritizing delivery relating to the particular behavioral targeting category during the time frame.

13. The method of claim 1, comprising adjusting at least one delivery policy to reflect an increased predicted click through rate, for a time frame and for a particular behavioral targeting category, that was predicted online during a particular online period, relative to a predicted click through rate, for the time frame and associated with the category, that was predicted during an offline period, comprising prioritizing delivery relating to the particular behavioral targeting category during the time frame, based at least in part on a ratio of the increased predicted click through rate, predicted online, to the predicted click through rate that was predicted during an offline period.

14. The method of claim 1, wherein serving threshold adjustment and delivery policy adjustment is performed automatically based on monitored online information.

15. The method of claim 1, wherein serving threshold adjustment and delivery policy adjustment is performed automatically based on monitored online information, to facilitate maintaining desired click through rate and delivery distribution across behavioral categories by facilitating accounting for differences between predicted user traffic patterns predicted offline from predicted user traffic patterns predicted online based on updated real-time or near real-time information.

16. A system comprising:
one or more server computers coupled to a network and Internet; and
one or more databases coupled to the one or more server computers;
wherein the one or more server computers are configured for:
during an offline period, initially determining a set of serving thresholds to be utilized in online advertisement serving, wherein a serving threshold is associated with a minimum anticipated click through rate;
during an offline period, initially determining a set of delivery policies, wherein a delivery policy is associated with one or more rules relating to serving of advertisements in accordance with required or optimal distribution of advertising inventory across serving opportunities;
during an online period, receiving and storing by a server coupled to the Internet, category-specific advertising information in one or more data sources;
during an online period, querying the one or more data sources to determine adjustments based on the stored category-specific advertising information;
during an online period, and based at least in part on information obtained during an online period, including the stored category-specific advertising information sent from the one or more data sources over the Internet, dynamically adjusting in real-time, based on the determined adjustments, at least one of the set of serving thresholds to determine at least one adjusted serving threshold, and dynamically adjusting in real-time at least one of the set of delivery policies to determine at least one adjusted delivery policy;
during an online period, utilizing a machine learning-based model in dynamically updating decision-making in real-time with regard to serving of online advertisements in connection with serving opportunities based at least in part on the at least one adjusted serving threshold and the at least one adjusted delivery policy, adjusted dynamically during the online period, wherein the machine learning-based model is initially trained during an offline period with advertising-related information stored in and queried from the one or more data sources and dynamically updated during an online period with real-time adjustments, wherein an online period is a period of active advertisement serving in which the model is utilized; and
during an online period, transmitting an online advertisement over the Internet based on a particular serving opportunity to a user device of a particular user based on the decision-making by the machine learning-based model.

17. The system of claim 16, wherein the one or more server computers are coupled to the Internet.

18. The system of claim 16, comprising utilizing a hierarchical taxonomy of behavioral targeting categories in behavioral targeting of users, wherein nodes represent behavioral targeting categories, and wherein delivery policies are utilized in optimally or more optimally distributing serving of advertisement inventory across nodes of the taxonomy.

19. The system of claim 16, comprising monitoring, during an online period, category-specific advertising inventory serving distribution information and category-specific click through rate information, for use in adjusting at least one serving threshold and at least one delivery policy.

20. A non-transitory computer readable medium or media containing instructions for executing a method for use in association with an online advertising auction relating to an online advertising marketplace, the method comprising:
during an offline period, initially determining a set of serving thresholds to be utilized in online advertisement serving, wherein a serving threshold is associated with a minimum anticipated click through rate;
during an offline period, initially determining a set of delivery policies, wherein a delivery policy is associated with one or more rules relating to serving of advertisements in accordance with required or optimal distribution of advertising inventory across serving opportunities;
wherein the distribution of advertising inventory across serving opportunities relates to distribution of advertising inventory across serving opportunities associated with different nodes of a hierarchical taxonomy of behavioral targeting categorical nodes;
during an online period, receiving and storing by a server coupled to the Internet, category-specific advertising information in one or more data sources;
during an online period, querying the one or more data sources to determine adjustments based on the stored category-specific advertising information;
during an online period, and based at least in part on information obtained during an online period, including the stored category-specific advertising information sent from the one or more data sources over the Internet, dynamically adjusting in real-time, based on the determined adjustments, at least one of the set of serving thresholds to determine at least one adjusted serving threshold, and dynamically adjusting in real-time at least one of the set of delivery policies to determine at least one adjusted delivery policy;
wherein the at least one adjusted serving threshold and the at least one adjusted delivery policy are adjusted at least in part to better optimize user targeting or advertising inventory distribution, based at least in part on the information obtained during the period;
during an online period, utilizing a machine learning-based model in dynamically updating decision-making in real-time with regard to serving of online advertisements in connection with serving opportunities based at least in part on the at least one adjusted serving threshold and the at least one adjusted delivery policy, adjusted dynamically during the online period, wherein the machine learning-based model is initially trained during an offline period with advertising-related information stored in and queried from the one or more data sources and dynamically updated during an online period with real-time adjustments, wherein an online period is a period of active advertisement serving in which the model is utilized;

wherein the machine-learning based model is trained using information including historical user behavior information; and during an online period, transmitting an online advertisement over the Internet based on a particular serving opportunity to a user device of a particular user based on the decision-making by the machine learning-based model.

\* \* \* \* \*

UNITED STATES PATENT AND TRADEMARK OFFICE
CERTIFICATE OF CORRECTION

PATENT NO.        : 9,754,266 B2
APPLICATION NO.   : 12/764732
DATED             : September 5, 2017
INVENTOR(S)       : Qing Zhang Page 1 of 1

It is certified that error appears in the above-identified patent and that said Letters Patent is hereby corrected as shown below:

On the Title Page

Inventor Qiong Zhang should be listed as Qing Zhang.

Signed and Sealed this
Eleventh Day of June, 2019

Andrei Iancu
*Director of the United States Patent and Trademark Office*